United States Patent Office 3,151,143
Patented Sept. 29, 1964

3,151,143
POLYHALOGEN CONTAINING BICYCLIC DIISOCYANATES
Paul E. Hoch, Youngstown, N.Y., assignor to Hooker Chemical Corporation, Niagara Falls, N.Y., a corporation of New York
No Drawing. Filed Sept. 4, 1959, Ser. No. 838,046
2 Claims. (Cl. 260—453)

This invention relates to compositions of matter known as polyhalogen containing bicyclic diisocyanates, methods of preparing same, and derivatives thereof. More particularly the present invention resides in 3,4,5,6,7,7-hexahalo-3,6-endomethylene- 1,2,3,6 - tetrahydrobenzene-1,2-diisocyanate, the urethanes, thiourethanes and ureas thereof, wherein the halogen is selected from the group consisting of chlorine, bromine, fluorine, and mixtures thereof.

The compositions of the present invention find utility in many applications. The diisocyanates of the present invention may be reacted with polymers containing hydroxyl or carboxyl groups to give polymers or foamed products which, due to the high halogen content, are flame retardant in nature. In addition, the diisocyanates may be reacted with themselves or other diisocyanates, polyols, polyamines or polythiols to give highly useful polymeric products. The diisocyanates of the present invention find utility in agricultural applications and as flame-proofing additives. In addition, the diisocyanate derivatives find utility in the preparation of polymeric materials which, due to the high halogen content, are flame retardant in nature.

The diisocyanates of the present invention may be conveniently prepared in accordance with the following equation given for purposes of illustration.

(I) 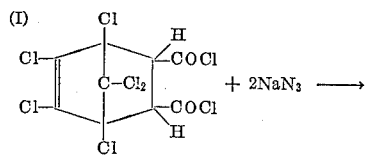 + 2NaN₃ ⟶

3,4,5,6,7,7-hexachloro-3,6-methano-1,2,3,6-tetrahydrophthaloyl chloride   Sodium azide

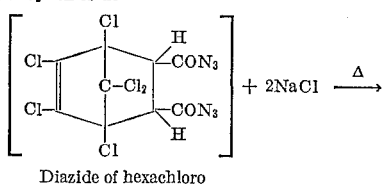 + 2NaCl $\xrightarrow{\Delta}$

Diazide of hexachloro methano-tetrahydro-phthaloyl chloride

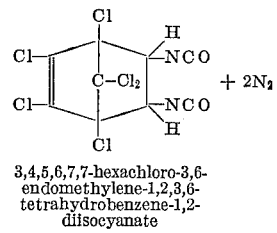 + 2N₂

3,4,5,6,7,7-hexachloro-3,6-endomethylene-1,2,3,6-tetrahydrobenzene-1,2-diisocyanate In the above reaction one mole of the hexachloro-methano-tetrahydrophthaloyl chloride is reacted with at least two moles of sodium azide. The starting material may also be fluoro or bromo substituted. Alternatively mixed chloro, fluoro, or bromo substituted compounds may be employed. Useful materials may also be obtained by substituting some of the halogens with alkoxy groups. Any alkali metal azide may be employed, for example, sodium, potassium, cesium, lithium, etc.

The urethanes and thiourethanes of the present invention may be prepared from the diisocyanates of the present invention in accordance with the following equation given for the purpose of illustration.

(II) 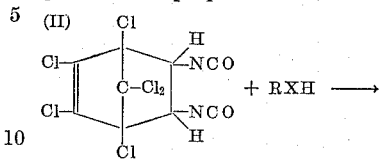 + RXH ⟶

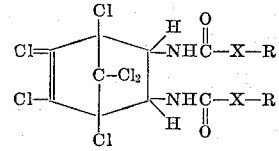

wherein R may be alkyl or aryl and wherein X may be oxygen or sulfur. Typical alkyl groups include methyl, ethyl, butyl, nonyl, etc. Typical aryl groups include phenyl, naphthyl, anthracyl, etc. In addition, substituted alkyl or substituted aryl may be employed, such as 2-chloroethanol, 2 - methoxyethanol, para - chlorophenol, meta-cresol, etc. The reaction proceeds in the conventional manner by merely admixing the desired reactants. The reaction is slightly exothermic and requires cooling.

The ureas of the present invention may be prepared in accordance with the following equation given for the purpose of illustration.

(III) 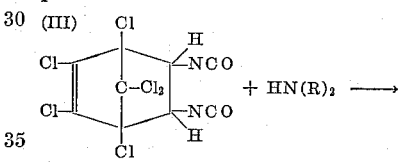 + HN(R)₂ ⟶

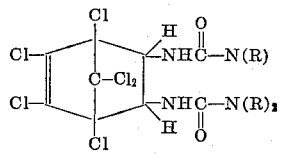

wherein R is as defined heretofore. In addition a primary amine may be employed instead of a secondary amine, i.e., a compound having the formula

The following examples will further illustrate the teachings and findings of this invention.

*Example 1.—Preparation of 3,4,5,6,7,7-Hexachloro-3,6-Emdomethylene-1,2,3,6-Tetrahydrobenzene-1,2 - Diisocyanate*

A suspension of 180 cubic centimeters dry chlorobenzene and 12.7 grams (0.196 mole) of sodium azide (activated previously with hydrazine and reprecipitated in acetone before use) was treated with 38 grams (0.089 mole) of 3,4,5,6,7,7-hexachloro-3,6-methano-1,2,3,6-tetrahydrophthaloyl chloride. The suspension developed an exotherm and the temperature rose from 28 to 40 degrees centigrade in 15 minutes. Heat was then applied and the temperature was raised to 71 degrees centigrade at which point gas evolution was observed and a second exotherm took place. The temperature rose to 86 degrees centigrade and cooling was resorted to. The suspension was maintained at a temperature of from about 64 to 77 degrees centigrade for 35 minutes, bringing the total reaction time to 2 hours and 40 minutes. The suspension was cooled to 25 degrees centigrade and filtered. The filtrate was evaporated under vacuum on a steam cone. The residue, weighing thirty grams, was the expected product.

*Analysis.*—Calculated for $C_9H_2Cl_6N_2O_2$: Cl, 55.6 percent. Found: 55.49 percent.

Example 2.—Preparation of a Polyurethane Foam

Ten grams of an alkyd prepared by condensing 7.6 moles of glycerol, 5 moles of adipic acid and 1 mole of phthalic anhydride were rapidly mixed with 18 grams of the product of Example 1, and 0.4 cubic centimeter of a solution of 1.5 grams of N-methyl naphthaline and 2.0 grams Emulphor in 96 grams water was added. The reaction mixture was stirred rapidly. Foaming began very rapidly. The mixture was poured into a paper cup and a rigid foam having a density of about 2 pounds per cubic foot formed within minutes. The foam was post cured at 100 degrees centigrade for one-half hour. The resulting foam was self extinguishing and did not melt when ignited.

Example 3.—Preparation of the Dibutyl Urethane Derivative

A solution of 3.5 grams of the product of Example 1 and 25 milliliters of N-butyl alcohol was refluxed for 10 minutes. The solution resulting was cooled and a micro crystalline solid separated. This material was recrystallized twice from ethanol to yield 1 gram of the expected product which had a melting point of 163 to 163.5 degrees centigrade.

*Analysis.*—Calculated for $C_{17}H_{22}Cl_6O_4N_2$: Cl, 40.2 percent. Found: Cl, 40.1 percent.

Example 4.—Preparation of the Diethyl Urethane Derivative

A solution of 4 grams of the product of Example 1 and 25 cubic centimeters of ethanol were stirred. The reaction was mildly exothermic. After 10 minutes the excess alcohol was evaporated and the resulting solid was recrystallized several times from nitromethane to yield 1.5 grams of the expected product. The melting point was 215 to 216 degrees centigrade with sublimation.

*Analysis.*—Calculated for $C_{13}H_{14}Cl_6N_2O_4$: Cl, 44.8 percent. Found: Cl, 44.4 percent.

Example 5.—Preparation of the Dipropyl Urea Derivative

A solution of 7.6 grams of the product of Example 1 in 50 cubic centimeters of dry ether was treated with 5.05 grams of isopropyl amine in 50 cubic centimeters of ether. An exothermic reaction took place and a solid separated. The white solid weighing 4.6 grams was washed with ether. This material was recrystallized from benzene several times yielding the expected product which had a melting point of 191 to 192 degrees centigrade with decomposition.

*Analysis.*—Calculated for $C_{21}H_{32}Cl_6O_2N_4$: Cl, 36.4 percent, N, 9.58 percent. Found: Cl, 36.6 percent, N, 9.3 percent.

Example 6.—Preparation of the Dibutyl Thiourethane Derivative

A mixture of 10 grams of the product of Example 1 and 4.7 grams of N-butyl mercaptan was permitted to stand at 25 degrees centigrade overnight. The reaction mixture was warmed on a steam cone for 10 minutes, and then the solution was cooled. The solid that formed was recrystallized four times from a cyclohexane-methanol solution to yield a solid which was the expected product and which had a melting point of 198 to 200 degrees centigrade with decomposition.

This invention may be embodied in other forms or carried out in other ways without departing from the spirit or essential characteristics thereof. The present embodiment is therefore to be considered as in all respects illustrative and not restrictive. The scope of the invention being indicated by the appended claims, and all changes which come within the meaning and range of equivalency are intended to be embraced therein.

I claim:

1. As a composition of matter, 3,4,5,6,7,7-hexahalo-3,6-endomethylene-1,2,3,6 - tetrahydrobenzene - 1,2-diisocyanate, wherein the halogen is selected from the group consisting of chlorine, fluorine, bromine and mixtures thereof.

2. 3,4,5,6,7,7-hexachloro-3,6-endomethylene-1,2,3,6-tetrahydrobenzene-1,2-diisocyanate.

References Cited in the file of this patent

UNITED STATES PATENTS

| | | |
|---|---|---|
| 2,544,709 | Mason | Mar. 13, 1951 |
| 2,617,817 | Ahlbrecht et al. | Nov. 11, 1952 |
| 2,812,347 | Newcomer et al. | Nov. 5, 1957 |
| 2,841,485 | Johnson et al. | July 1, 1958 |

OTHER REFERENCES

Smith: Organic Reactions, vol. 3, pp. 337–339 (The Curtius Reaction), 1946.

Bergmann: The Chemistry of Acetylene and Related Compounds, 1948, page 80.